(12) United States Patent
Yamagishi

(10) Patent No.: US 9,774,921 B2
(45) Date of Patent: Sep. 26, 2017

(54) CONTENT TRANSFER DEVICE AND CONTENT TRANSFER METHOD, CONTENT REPRODUCTION DEVICE AND CONTENT REPRODUCTION METHOD, CONTENT DISTRIBUTION SYSTEM AND COMPUTER PROGRAM

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 13/859,957

(22) Filed: Apr. 10, 2013

(65) Prior Publication Data

US 2013/0291036 A1 Oct. 31, 2013

(30) Foreign Application Priority Data

Apr. 27, 2012 (JP) .................................. 2012-102260

(51) Int. Cl.
| | |
|---|---|
| *H04N 5/445* | (2011.01) |
| *H04N 7/173* | (2011.01) |
| *H04N 21/643* | (2011.01) |
| *H04N 21/234* | (2011.01) |
| *H04N 21/2747* | (2011.01) |
| *H04N 21/235* | (2011.01) |
| *H04N 21/6587* | (2011.01) |
| *H04L 29/06* | (2006.01) |
| *H04L 29/08* | (2006.01) |

(52) U.S. Cl.
CPC ... *H04N 21/64322* (2013.01); *H04L 65/4069* (2013.01); *H04L 65/4092* (2013.01); *H04N 21/2355* (2013.01); *H04N 21/23424* (2013.01); *H04N 21/2747* (2013.01); *H04N 21/6587* (2013.01); *H04L 65/4084* (2013.01); *H04L 67/02* (2013.01)

(58) Field of Classification Search
CPC ......... H04N 21/23424; H04N 21/2355; H04N 21/2747
USPC ...................................................... 725/51, 109
See application file for complete search history.

(56) References Cited

U.S. PATENT DOCUMENTS 7,257,122 B1 * 8/2007 Keturi ..................... H04L 29/06
370/401
8,230,004 B2 7/2012 Igarashi
8,316,082 B2 11/2012 Igarashi
(Continued)

FOREIGN PATENT DOCUMENTS

| CA | 2610515 A1 | 5/2008 |
|---|---|---|
| CN | 101155191 A | 4/2008 |

(Continued)

OTHER PUBLICATIONS

European Search Report from EP Application No. 13164415, dated Aug. 6, 2013.

(Continued)

*Primary Examiner* — Pankaj Kumar
*Assistant Examiner* — Franklin Andramuno
(74) *Attorney, Agent, or Firm* — Lerner, David, Littenberg, Krumholz & Mentlik, LLP

(57) ABSTRACT

An apparatus may include a control unit to control transmission of a transformed video stream over a network, in response to a reproduction control command for a video stream realized by an application executed by a browser at a client device.

12 Claims, 10 Drawing Sheets

(56) References Cited

U.S. PATENT DOCUMENTS

| | | | |
|---|---|---|---|
| 8,745,257 B1* | 6/2014 | Karimov et al. | 709/231 |
| 2002/0186234 A1* | 12/2002 | Van De Streek et al. | 345/719 |
| 2004/0125757 A1 | 7/2004 | Mela et al. | |
| 2006/0277316 A1 | 12/2006 | Wang et al. | |
| 2007/0273754 A1* | 11/2007 | Cockerton et al. | 348/14.08 |
| 2008/0275963 A1* | 11/2008 | Hatfield | G06F 17/30887 709/218 |
| 2009/0070499 A1* | 3/2009 | Takase et al. | 710/60 |
| 2009/0100147 A1 | 4/2009 | Igarashi | |
| 2009/0180484 A1 | 7/2009 | Igarashi | |
| 2009/0193469 A1 | 7/2009 | Igarashi | |
| 2009/0235317 A1 | 9/2009 | Igarashi | |
| 2009/0320073 A1* | 12/2009 | Reisman | 725/51 |
| 2010/0100914 A1 | 4/2010 | Sugiyama et al. | |
| 2011/0265134 A1* | 10/2011 | Jaggi et al. | 725/109 |
| 2012/0268553 A1* | 10/2012 | Talukder | 348/14.08 |
| 2012/0331106 A1* | 12/2012 | Ramamurthy et al. | 709/218 |

FOREIGN PATENT DOCUMENTS

| | | | |
|---|---|---|---|
| CN | 101197832 A | 6/2008 | |
| EP | 1926319 A2 | 5/2008 | |
| EP | 2071838 A1 | 6/2009 | |
| EP | 2175591 A1 | 4/2010 | |
| JP | H11313059 A | 11/1999 | |
| JP | 2004088315 A | 3/2004 | |
| JP | 2006515966 A | 6/2006 | |
| JP | 2007-272868 A | 10/2007 | |
| JP | 2009230256 | 10/2009 | |
| JP | 2010011378 A | 1/2010 | |
| JP | 2010199860 A | 9/2010 | |
| JP | 2011114421 A | 6/2011 | |
| JP | 2012080310 A | 4/2012 | |
| JP | 2012102260 A | 5/2012 | |
| WO | 2008-091009 A1 | 7/2008 | |
| WO | 2010144453 A1 | 12/2010 | |

OTHER PUBLICATIONS

Japanese Office Action for Application No. 2012102260, dated Feb. 2, 2016.

Japanese Office Action for Application No. 2012102260 dated Jan. 10, 2017.

Chinese Office Action for Application No. 201310137100.4 dated Jan. 26, 2017.

* cited by examiner

CONTENT TRANSFER DEVICE AND CONTENT TRANSFER METHOD, CONTENT REPRODUCTION DEVICE AND CONTENT REPRODUCTION METHOD, CONTENT DISTRIBUTION SYSTEM AND COMPUTER PROGRAM

CROSS-REFERENCE TO RELATED APPLICATIONS

The present application claims priority from Japanese Patent Application JP 2012-102260 filed on Apr. 27, 2012, the disclosure of which is hereby incorporated herein by reference.

BACKGROUND

The present technology relates to a content transfer device and a content transfer method which transfer a content stream exported from a streaming server, a content reproduction device and a content reproduction method which perform the selection of content and the reproduction of content, a content distribution system, and a computer program, for example, to a content transfer device and a content transfer method which transfer a content stream distributed by an IPTV broadcast service to an IPTV service client, a content reproduction device and a content reproduction method which perform the selection of content or channels and the reproduction of content as a client in an IPTV service, a content distribution system and a computer program.

Progress is being made in the commercialization of IPTV services and VOD (Video on Demand) services which transmit video content that had been broadcast using ground waves or satellite waves via an IP (Internet Protocol) broadband network.

In the IPTV distribution system of the related art, the HTTP (Hyper Text Transfer Protocol) is being used for the acquisition and control of the AV stream. In other words, in an Internet TB distribution system which uses a network in which the quality is not guaranteed, in general, a method is adopted in which transfer is performed using the same HTTP and TCP (Transmission Control Protocol) protocols for both the acquisition control messages of the content and the AV stream of the content (for example, refer to Japanese Unexamined Patent Application Publication No. 2007-272868).

Meanwhile, in a network in which the QoS of (Quality of Service) is guaranteed, such as NGN (Next Generation Network), the introduction of which is being led by the carriers of various countries, a streaming session is established using a protocol such as SIP (Session Initiation Protocol) or RTSP (Real Time Streaming Protocol), and the AV stream is transferred using a protocol such as RTP (Real time Transport Protocol) (for example, refer to International Publication WO 2008/091009).

In general, there are different implementation profiles (sets of protocol parameters) of the clients of the IPTV protocol using SIP/RTSP and RTP for each carrier. Therefore, the device vendors which develop and manufacture devices such as STBs (Set Top Boxes) which receive IPTV have to implement an individual IPTV client for each carrier (an IPTV client application for each carrier).

In FIG. 10, a video distribution system is schematically shown in which the establishment of a streaming session is performed using the SIP/RTSP protocol, in addition to transferring the AV stream using the RTP protocol. In the illustrated example, individual services known as IPTV service A and IPTV service B are respectively provided from two carriers, and a server is installed for each service. Here, in order to receive the distribution service from the server of the IPTV service A, an individual IPTV client application for service A is necessary, and in order to receive the distribution service from the server of the IPTV service B, an individual IPTV client application for service B is necessary. Specifically, these client service applications for each of the services are embedded software inside the STB issued by each carrier. In such cases, it is necessary for the carrier to change the devices (in other words, the STB) when changing the service. In addition, it is necessary for the vendor of the client application to develop and maintain the client application in accordance with the individual protocols of each carrier (in other words, each service). In addition, after subscribing to the IPTV service of a carrier, it is necessary for the end user to buy another STB when the user wants to further use the IPVT service of a different carrier.

The device vendors have a desire to reuse the IPTV client implementation they have developed for the IPTV service of a carrier for the IPTV service of a plurality of other carriers. In order to achieve this, it is necessary to either implement a different individual IPTV service protocol for each carrier for one client, or to implement a plurality of different individual IPTV clients for each carrier. The protocol implementation costs the device vendor. In addition, a problem occurs in that the maintenance regarding the addition of functions in accordance with the requests from the service provider costs the device vendor.

In addition, it is necessary to provide a uniform service which does not depend on the differences in implementation between each client in relation to the end user, no matter which of the clients of the different implementations by the plurality of different client vendors is used. Therefore, there is a problem in that the service provider has to spend more time and money on service development and maintenance such as testing and management of service quality.

SUMMARY

It is desirable to provide an excellent content transfer device and content transfer method which can favorably transfer a content stream distributed by an IPTV broadcast service to an IPTV service client, as well as to provide a computer program.

In addition, it is desirable to provide an excellent content reproduction device and content reproduction method which can favorably perform selection of the content or channel, or reproduction of the content as a client in an IPTV service, as well as a computer program.

In addition, it is desirable to provide an excellent content distribution system in which it is possible to reduce the cost of the implementation and maintenance of an IPTV client, and to make the service quality in relation to each client uniform.

According to an embodiment of the present disclosure, an apparatus may include a control unit to control transmission of a transformed video stream over a network, in response to a reproduction control command for a video stream realized by an application executed by a browser at a client device.

According to an embodiment of the present disclosure, a method may include controlling, by a processor, transmission of a transformed video stream over a network, in response to a reproduction control command for a video stream realized by an application executed by a browser at a client device.

According to an embodiment of the present disclosure, a non-transitory recording medium may be recorded with a program executable by a computer. The program may include controlling transmission of a transformed video stream over a network, in response to a reproduction control command for a video stream realized by an application executed by a browser at a client device.

According to an embodiment of the present disclosure, an apparatus may include a control unit to control transmission of a reproduction control command for a video stream realized by an application executed by a browser, to cause transmission of a transformed video stream from another apparatus over a network.

According to an embodiment of the present disclosure, a method may include controlling, by a processor, transmission of a reproduction control command for a video stream realized by an application executed by a browser, to cause transmission of a transformed video stream from an apparatus over a network.

According to the technology disclosed in the present specification, it is possible to provide an excellent content transfer device and content transfer method which can favorably transfer a content stream distributed by an IPTV broadcast service to an IPTV service client, as well as a computer program.

In addition, according to the technology disclosed in the present specification, it is possible to provide an excellent content reproduction device and content reproduction method which can favorably perform selection of the content or channel, or reproduction of the content as a client in an IPTV service, as well as a computer program.

In addition, according to the technology disclosed in the present specification, it is possible to provide an excellent content distribution system in which it is possible to reduce the cost of the implementation and maintenance of an IPTV client, and to make the service quality in relation to each client uniform.

In an IPTV distribution system to which the technology disclosed in the present specification is applied, the functions of an IPTV service client provided from a plurality of different service providers may be separated into navigation (a function of selecting the content), reproduction control (a function which sends commands as in trick play, such as normal reproduction (play), stopping (stop), rewind reproduction (rewind), fast forward reproduction (forward), and pause), and streaming (a function which transfers and reproduces the AV stream), the first two being realized as a browser application, and the latter one being implemented as a player which is transparent to the IPTV service protocol (is common and does not depend on the differences between the IP service protocols). Therefore, it is sufficient for the device vendor to develop a browser application for each service, and it is possible to reduce the cost of individually implementing and maintaining clients for a plurality of different services. In addition, for the service provider, since the content which the end user selected via the browser is streamed using the RTP protocol through a network in which the quality is guaranteed in accordance with the reproduction control commands specified on the browser, it is possible to achieve unification of the service quality. In addition, it is possible to greatly improve the performance when performing a channel change in the IP broadcast distribution despite using an HTTP streaming client.

Furthermore, other objects, characteristics, and advantages of the technology disclosed in the present specification will be clarified by detailed description based on the embodiments and the accompanying drawings described below.

DETAILED DESCRIPTION OF EMBODIMENTS

Embodiments of the technology disclosed in the present specification will be described in detail below with reference to the drawings.

Figure 1:
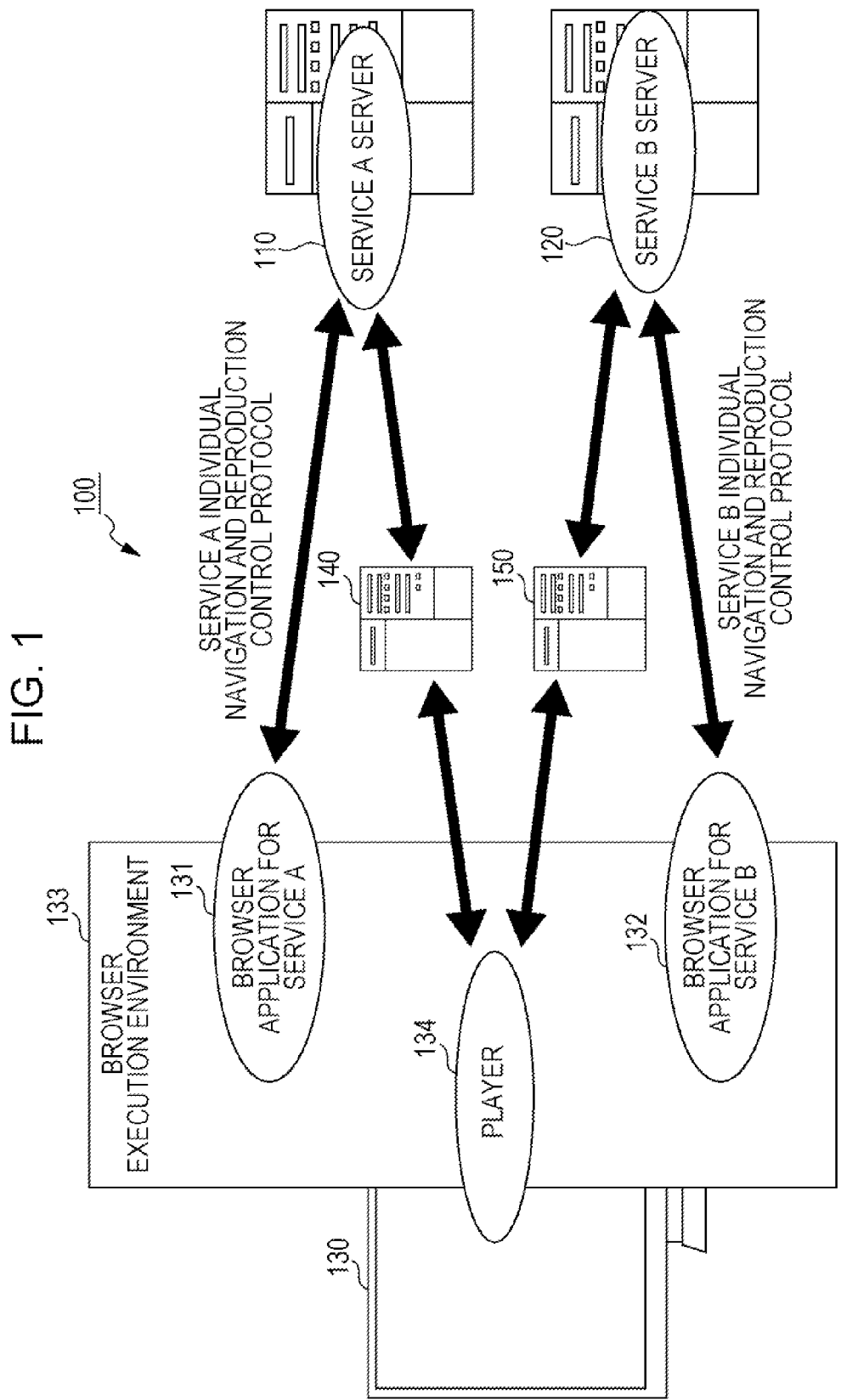
FIG. 1 is a view schematically showing the configuration of an IPTV distribution system realized by applying the technology disclosed in the present specification.

FIG. 1 schematically shows the configuration of an IPTV distribution system 100 realized by applying the technology disclosed in the present specification. In the illustrated example, individual services known as IPTV service A and IPTV service B are respectively provided from two carriers, and a server is installed for each service.

In the technology disclosed in the present specification, the functions of an IPTV service client provided from a plurality of different service providers may be separated into navigation (a function of selecting the content), reproduction control (a function which sends commands as in trick play, such as normal reproduction (play), stopping (stop), rewind reproduction (rewind), fast forward reproduction (forward), and pause), and streaming (a function which transfers and reproduces the AV stream), the first two being realized as a browser application, and the latter one being implemented as a player which is transparent to the IPTV service protocol (is common and does not depend on the differences between the IP service protocols). A browser application provided with functions of navigation and reproduction control is provided from a portal site of a carrier as a portal application.

In the example shown in FIG. 1, the individual protocols of navigation and reproduction control for service A are supplied from a service A server 110 as a browser application for service A 131. On the end user side, it is possible to perform selection of content which the navigation, in other words, the service A distributes, as well as reproduction control of the content by downloading the browser application for service A 131 from the service A server 110 to a client device 130 such as a TV receiver and launching the application in a browser execution environment 133.

Similarly, the individual protocols of navigation and reproduction control for service B are supplied from a service B server 120 as a browser application for service B 132. On the end user side, it is possible to perform the navigation as well as the reproduction control of the content by downloading the browser application for service B 132 from the service B server 120 to the client device 130 and launching the application in the browser execution environment 133.

Furthermore, on the client device 130, the content that was streaming distributed from the service A server 110 is received via an edge server 140 and reproduced using a player 134 which operates on the client device.

The edge server 140 downloads the individual streaming protocol translation server application for service A from the service A server 110 and launches the server application. As described below, the streaming session with the client device 130, which uses the individual IPTV service translation server for service A operating on the edge server 140, is permanent.

Here, there are individual streaming sessions for the provider between the streaming server and the edge server 140 of the service A such as SIP, RTSP and RTP/RTCP (described below). The edge server 140 as an individual IPTV service translation server for the service A converts the individual streaming format exported from the streaming server into a streaming format which can be processed by the player 134 on the client device 130 side and exports the converted streaming format. Therefore, on the client device 130, it is possible to reproduce the content provided from the service A by using a player which is transparent to the IPTV service protocol (is common and does not depend on the differences between the IP service protocols) such as a media player of Windows (registered trademark). In addition, the edge server 140 as an individual IPTV service translation server for the service A performs transactions by converting the reproduction control commands from the client device 130 into an individual IPTV service reproduction control protocol which can be interpreted by the streaming server.

The end user performs reproduction control via the browser during the reproduction of the content which is stream distributed on the player 134. The edge server 140 controls the streaming operations to the player 134 in accordance with the reproduction control commands transmitted as HTTP requests from the browser.

Similarly, the content that was streaming distributed from the service B server 120 is received via an edge server 150 and reproduced using the player 134 which operates on the client device 130.

The edge server 150 launches the individual streaming protocol translation server application for service B, which was downloaded from the service B server 120. As described below, the streaming session with the client device 130, which uses the individual IPTV service translation server for service B operating on the edge server 150, is permanent.

Here, the edge server 150 as an individual IPTV service translation server for the service B converts the individual streaming format exported from the streaming server of the service B into a streaming format which can be processed by the player 134 on the client device 130 side and exports the converted streaming format. Therefore, on the client device 130, it is possible to reproduce the content provided from the service B by using the player 134 which is transparent to the IPTV service protocol. In addition, the edge server 150 as an individual IPTV service translation server for the service B performs transactions by converting the reproduction control commands from the client device 130 into an individual IPTV service reproduction control protocol which can be interpreted by the streaming server.

The end user performs reproduction control via the browser during the reproduction of the content which is stream distributed on the player 134. The edge server 150 controls the streaming operations to the player 134 in accordance with the reproduction control commands transmitted as HTTP requests from the browser.

In the IPTV distribution system 100 shown in FIG. 1, the service provider which provides the service A, the service B, or the like can provide a uniform service which does not depend on the differences in implementation between each client to an end user and the time and cost burden may be significantly reduced by just developing and performing maintenance on a browser application for each service to be downloaded as a portal application in the client device 130.

In addition, the device vendor only has to develop and perform maintenance on a standard browser execution environment that operated on the client device 130, which significantly reduces the cost burden in comparison to a case in which either implementing a plurality of different individual IPTV service protocols for each carrier, or implementing a plurality of different individual IPTV clients for each carrier.

Figure 2:
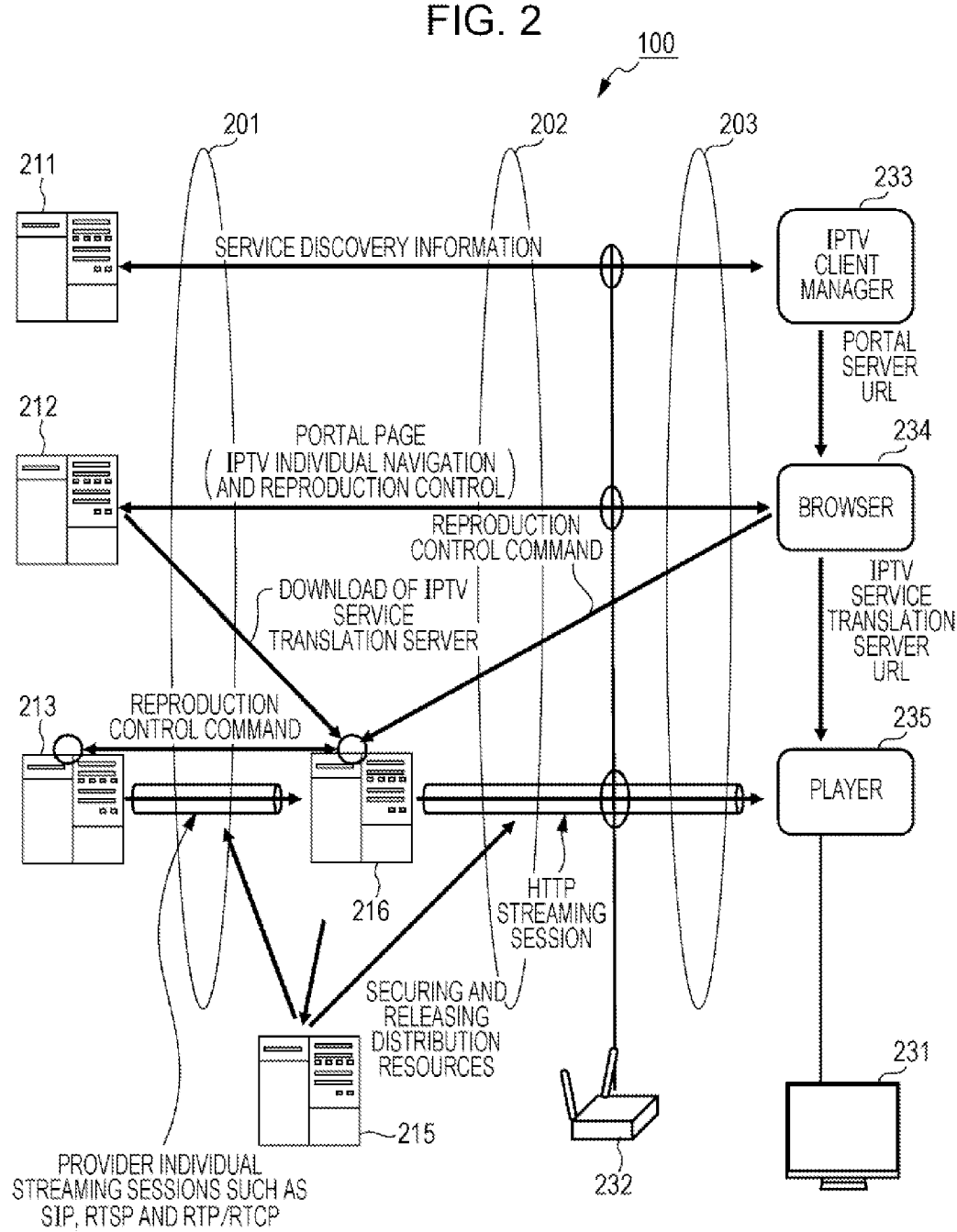
FIG. 2 is a view showing a specific configuration example for performing a content distribution service by using a permanent streaming session in the IPTV distribution system.

FIG. 2 shows a specific configuration example for performing a content distribution service by using a permanent streaming session in the IPTV distribution system 100. In FIG. 2, in order to simplify illustration, the IPTV distribution system 100 is depicted focusing on one video distribution service.

Core network 201 and access network 202 are networks owned by the carriers (service providers) which provide the IPTV distribution service. The core network 201 is equivalent to a so-called backbone network, and the access network 202 is a high speed network configured by an optical fiber network or the like. In the illustrated example, the carrier has server side entities in the IPTV service such as a service discovery server 211, a portal server 212, a streaming server 213, individual streaming servers 213 for providers such as SIP, RTSP and RTP/RTCP, and a resource management server 215, on the core network 201. In addition, an edge server 216 which connects the core network 201 and the access network 202 is installed for each region in the provider network. The edge server 216 relays the streaming from the streaming server 213 to the client device 231.

The service discovery server 211 is a server for discovering IPTV services that an IPTV client manager 233 of the client device 231 accesses and that the client can access. The service discovery server 211 manages the attributes of the IPTV services in which service provision is possible. The IPTV service provider registers the information necessary for the service access to the service discovery server 211. Examples of information elements which the service discovery server 211 provides to the client side include the name of the IPTV service, the summary of the IPTV service, and the URL of the IPTV service portal (the portal server).

The portal server 212 is a server which provides an IPTV portal page (VoD content or the shop front (a site which performs selection of the content to purchase and the purchase processing) of an IP broadcast channel) as well as the reproduction control screen of each item of content and channel introduced from the portal page to the portal application (an application which handles the content navigation and the reproduction control) which is executed on a browser 234 of the client device 231.

The edge server 216 is a server installed in the vicinity of the network hub (building) of each region (as long as it is possible to access from the client side, anywhere other than the home network 203 is acceptable and location is not particularly an issue).

Figure 8:
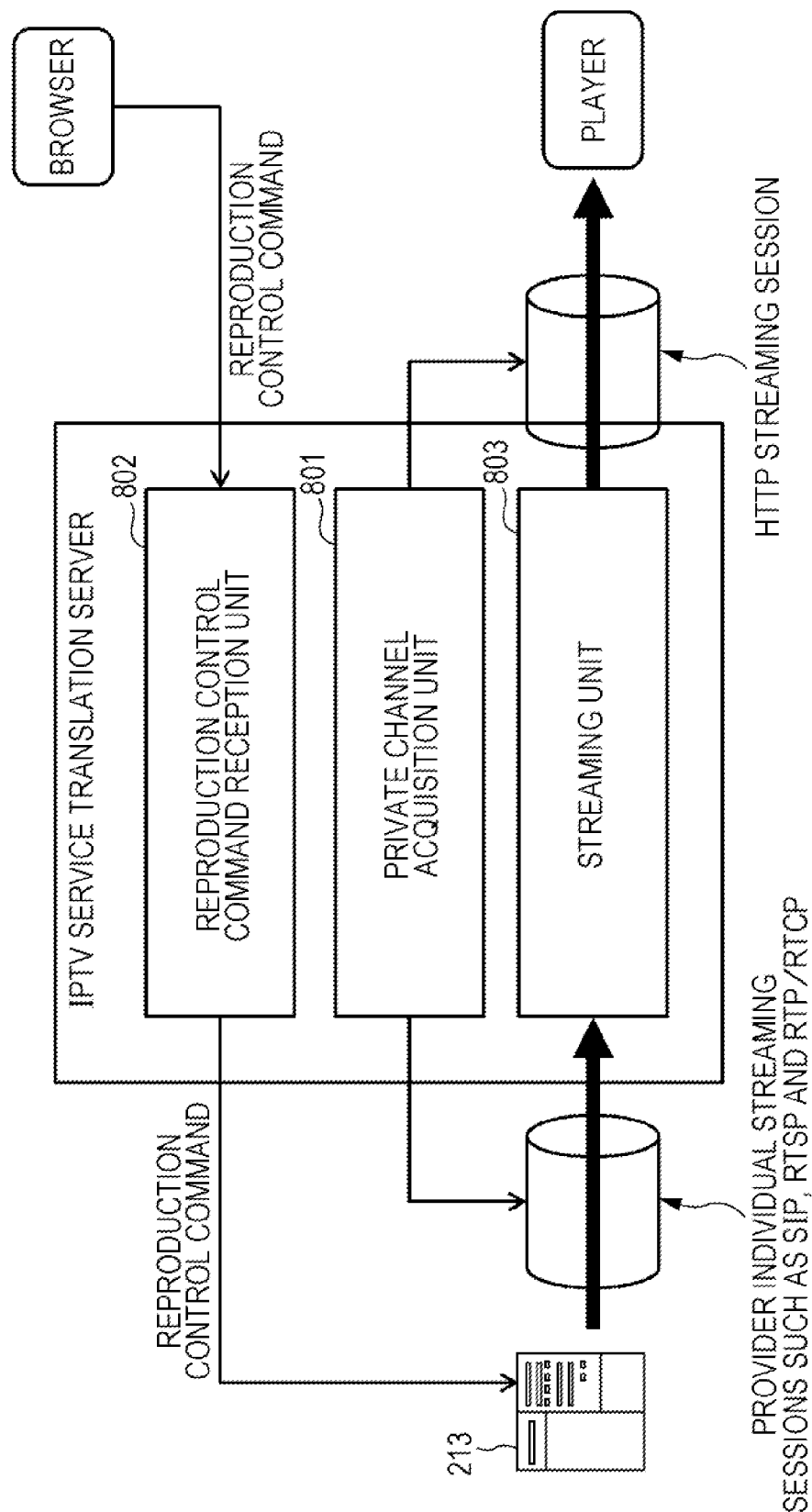
FIG. 8 is a view schematically showing the functional configuration of an IPTV service translation server.

In the present embodiment, the edge server 216 functions as the IPTV service translation server by, for example, executing a designated server application downloaded from the portal server 212. FIG. 8 schematically shows the functional configuration of an IPTV service translation server. The IPTV service translation server (streaming unit 803) receives the streaming request of the content or the channel from the client which the streaming server 213 is responsible for and exports the correlating stream. In addition, the IPTV service translation server (private channel establishing unit 801) establishes one HTTP pseudo streaming channel (session) with guaranteed bandwidth as a private channel with a player 235 on the client device 231. In addition, individual streaming sessions are established for the provider between the streaming server 213 and the translation server such as SIP, RTSP and RTP/RTCP. The streaming unit 803 constantly transfers the streaming on all of the channels to the player 235 side. Furthermore, if necessary, the security of the HTTP pseudo streaming session is secured using SSL (Secure Sockets Layer) or the like. The IPTV service translation server on the edge server 216 is typically accessed by one URL from the player 235 on the client device 231. In addition, when the IPTV service translation server (reproduction control command reception unit 802) receives a reproduction control command related to the stream reproduction from the portal application which operated on the client device 231, the IPTV service translation server performs stream processing such that the player only has to perform the same processing as in normal reproduction.

The resource management server 215 performs the securing of the distribution resources with the streaming server 213 and with the player on the client device 231 in accordance with the request from the IPTV service translation server (private channel establishing unit 801) on the edge server 216. For the distribution resource securing, the IMS/SIP protocol used in carrier private networks such as NGN, the OpenFlow-API which will be standardized in the future, individual protocols for carrier network equipment, or the like are used (described below).

The streaming server 213 receives the streaming request of the content or the streaming request of the channel from the IPTV service translation server and exports the corresponding content stream.

Meanwhile, a home network 203 is installed in the household of the end user. The home network 203 is interconnected with the network of the carrier such as the access network 202 via a modem or a router 232. The home network 203 is in accordance with the technical specifications of, for example, DLNA (Digital Living Network Alliance) or the like, however, since this is not directly related to the embodiment of the technology disclosed in the present specification, detailed description of such technical specifications is omitted.

The client device 231 is connected to the home network 203. Entities such as the IPTV client manager 233, the browser 234, and the player 235 operate on the client device 231. Furthermore, the navigation (a function of selecting the content), and the reproduction control (a function which sends commands as in trick play, such as normal reproduction (play), stopping (stop), rewind reproduction (rewind), fast forward reproduction (forward), and pause) are realized by the portal application executed by the browser 234, and the function of streaming (a function which transfers and reproduces the AV stream) is realized by the player 235.

Figure 9:
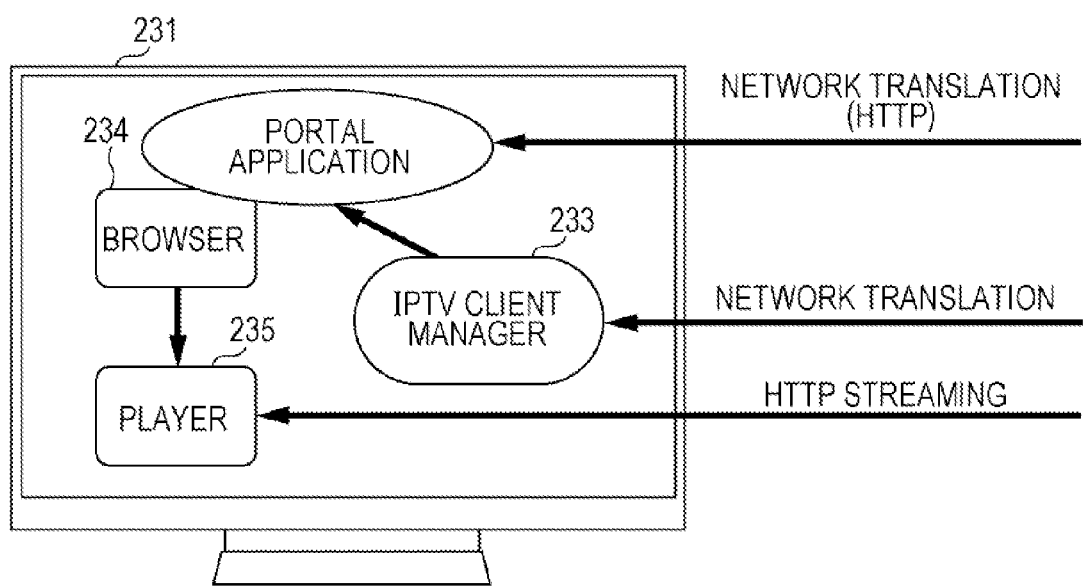
FIG. 9 is a view showing the entities of the client device side in the IPTV service.

The IPTV client manager 233, the browser 234 and the player 235 are each entities of the client device 231 side in the IPTV service (refer to FIG. 9).

When launched, the IPTV client manager 233 acquires the IPTV service discovery information from the service discovery server 211 and launches the browser 234 based on the portal URL provided therefrom.

The browser 234 is equivalent to the HTML (Hyper Text Markup Language) browser 234, and includes a JavaScript (registered trademark) application execution environment. The browser 234 is a module in which the portal browser page (the portal application) which was downloaded from the portal URL (the portal server 212) is executed. The browser 234 performs presentation of the content via a GUI (Graphical User Interface) processing system and conversation management with the end user. In the portal application, the browser 234 performs the selection of the content or the channel as well as the processing of the reproduction control screen of the selected content or channel.

The player 235 is a module which reproduces and presents the stream, and as well as being implemented externally to the browser, there are also cases in which the player 235 is embedded in the browser 234. In the present embodiment, the player 235 establishes one HTTP pseudo streaming channel (session) with guaranteed bandwidth as a private channel with the IPTV service translation server on the edge server 216 and receives all of the streaming on this session constantly. If necessary, the security of the HTTP pseudo streaming session is secured using SSL or the like.

Figure 3:
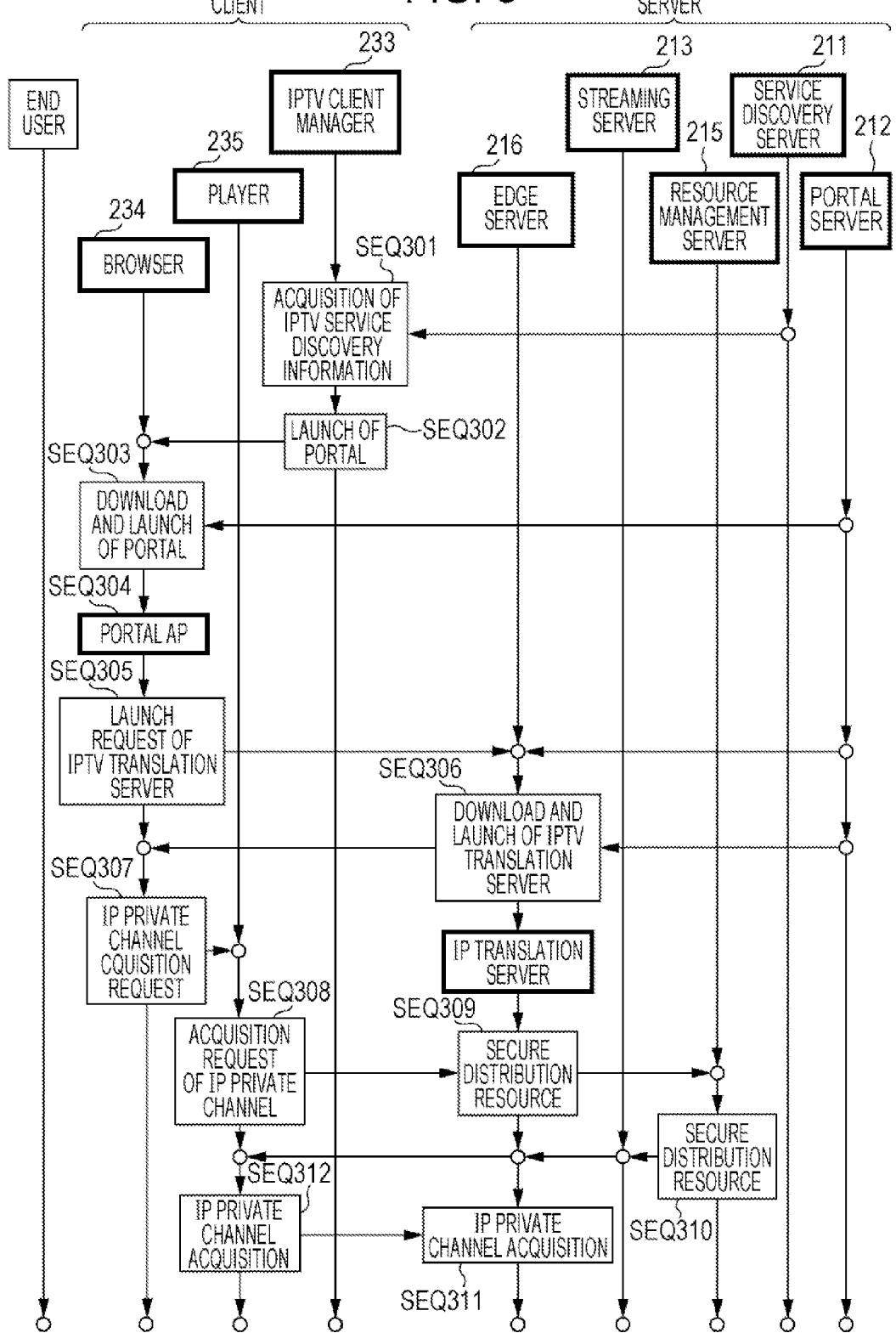
FIG. 3 is a view showing a sequence example for performing a content stream distribution service by using a permanent streaming session in the IPTV distribution system.

FIG. 3 shows a sequence example for performing a content stream distribution service by using a permanent streaming session in the IPTV distribution system 100 (however, only until the private channel is established). In the illustrated sequence, streaming is performed corresponding to the streaming request of the content from the client side. Hereinafter, the workings of the IPTV distribution system 100 shown in FIG. 2 will be described with reference to FIG. 3.

The IPTV client manager 233 on the client device 231 acquires a list for searching for the service providers which provide the IPTV service, in other words, the service discovery information, from the service discovery server 211 (SEQ 301). In the service discovery information, the name of the service and the portal URL (Uniform Resource Locator) of the IPTV service are defined as attributes of the IPTV service. The IPTV client manager 233 launches the browser 234 based on the portal URL (SEQ 302).

Figure 10:
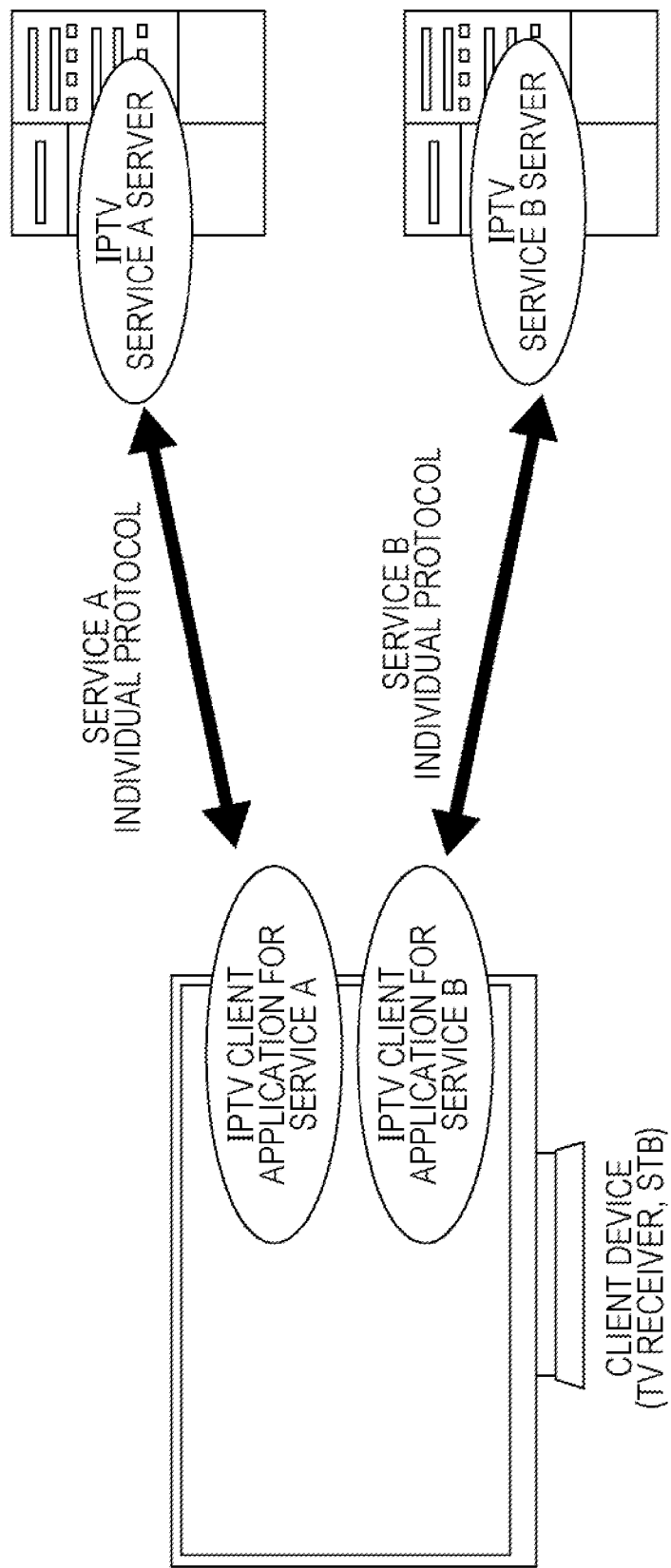
FIG. 10 is a view schematically showing a video distribution system (an example of the related art) in which the establishment of a streaming session is performed using the SIP/RTSP protocol, in addition to transferring the AV stream using the RTP protocol.

The browser 234 downloads (DL) the portal page from the portal server 212 and presents it to the end user (SEQ 303). Here, since the portal page itself is developed by the IPTV service provider, it is sufficient for the client vendor to only implement the browser execution environment, and it is not necessary to implement an IPTV client peculiar to each provider like in the system of the related art shown in FIG. 10. Furthermore, it is possible for all of the service providers to design the content navigation sequences in relation to the selection processing of the content, and changes and the like are also simple. Therefore, it is possible for the service provider to achieve unification of the service quality provided to each client and a reduction in maintenance costs.

Here, a portal application written in, for example, JavaScript (registered trademark) is included in the portal page. The portal application is executed corresponding to the end user's selection of the desired IPTV content or broadcast channel via the portal page displayed on the browser 234 (SEQ 304). Alternately, the portal application is executed at the point in time that the portal page is opened.

The portal application such as the browser application for service A or the browser application for service B requests, in relation to the edge server 216 installed in the region of the application within the provider network, that the relevant IPTV service translation server application be downloaded (DL) and executed (SEQ 305). Alternately, it is also possible to download a plurality of the IPTV service translation server applications which may be used beforehand to the edge server 216 from the portal server 212. However, if the overheads to executing after downloading are sufficiently small, it is preferable to download this type of application each time in order to achieve better convenience of maintenance, version management, and the like. When the edge server 216 launches the IPTV service translation server downloaded from the portal server 212 (SEQ 306), the edge server 216 returns a response to the translation server launch request to the request source portal application.

In addition, the portal application requests, in relation to the player 235 (implemented to process the AV streaming protocol and reproduce the stream) on the client device 231, that an IPTV private channel be established with the IPTV service translation server operating on the edge server 216 (SEQ 307). Furthermore, the player 235 issues an IPTV private channel establishment request to the edge server 216 (SEQ 308). This IPTV private channel is a private HTTP streaming session individually allocated to each client (this refers not to a TCP session which completes after each individual HTTP request or acquisition transaction, but a session of a longer continuous time).

The IPTV service translation server on the edge server 216, in response to the IPTV private channel establishment request from the player 235, requests the securing of the distribution resources such as CPU (Central Processing Unit), memory region and network interface, which are necessary for streaming, through the IPTV private channel between the appropriate translation server and the player 235 in relation to the resource management server 215 (SEQ 309). It is assumed that the resource management server 215, in response to this request, constantly secures the above-described communication resources from the establishment of the streaming session to the release thereof (SEQ 310).

Furthermore, for the distribution resource securing, the IMS (IP Multimedia Subsystem)/SIP protocol used in carrier private networks such as NGN, the OpenFlow-API, individual protocols for carrier networks, or the like may be used. Here, IMS is a communication method for next generation public communications networks which realizes a multimedia service by consolidating public communication services which have different circuit switches and packet switches such as the fixed phone network and the mobile communication network using SIP. In addition, OpenFlow is network control technology which the OpenFlow switching consortium advocate, is a communication method which defines a series of communications determined by the combination of MAC (Media Access Control) address, IP address, port number, and the like as a "flow", and secures quality and improves the network utilization factor by performing path control by the flow unit. In the present embodiment, the necessary resources are secured in order to provide the distribution resources and quality levels defined in the SLA (Service Level Agreement) of the contract that the end user agreed to. An SLA is a system in which the communication service enterprise guarantees a quality of service to the user which indicates that regulations relating to the compensation items of service quality such as the minimum communication speed, the average delay time, and the upper limit of downtime, as well as the reduction of usage fees when the above items were not realizable, are included in the service contract.

When the distribution resources are secured, the QoS in relation to the IPTV distribution service of the IPTV private channel is guaranteed. Accordingly, between the IPTV service translation server on the edge server 216 and the player 235, one HTTP pseudo streaming channel (session) with guaranteed bandwidth is established as the IPTV private channel (SEQ 311, 312). The IPTV private channel is permanent, and is a bandwidth guaranteed path in which HTTP request transmission from the player 235, and HTTP response from the translation server on the edge server 216 are typically possible. The IPTV service translation server on the edge server 216 constantly transfers the streaming on all of the channels to the player 235 side. If necessary, the security of the HTTP pseudo streaming session is secured using SSL or the like.

Subsequently, the end user performs the selection of the content using the content navigation function of the portal application which the browser 234 executes. In the process of the content navigation, the portal application on the browser performs transactions with the portal server, and the end user can select the desired content while referencing the attribute information of the content (the title, the outline, the price, and the like).

The portal application, in addition to the URL of the content that the end user selected, issues a streaming request and instructs the stream export of the content in relation to the IPTV service translation server on the edge server 216. In relation to this instruction, the IPTV service translation server exports the content stream instructed by URL using the permanent streaming session. Furthermore, on the client device 231, the player performs the streaming reproduction of the content.

Figure 4:
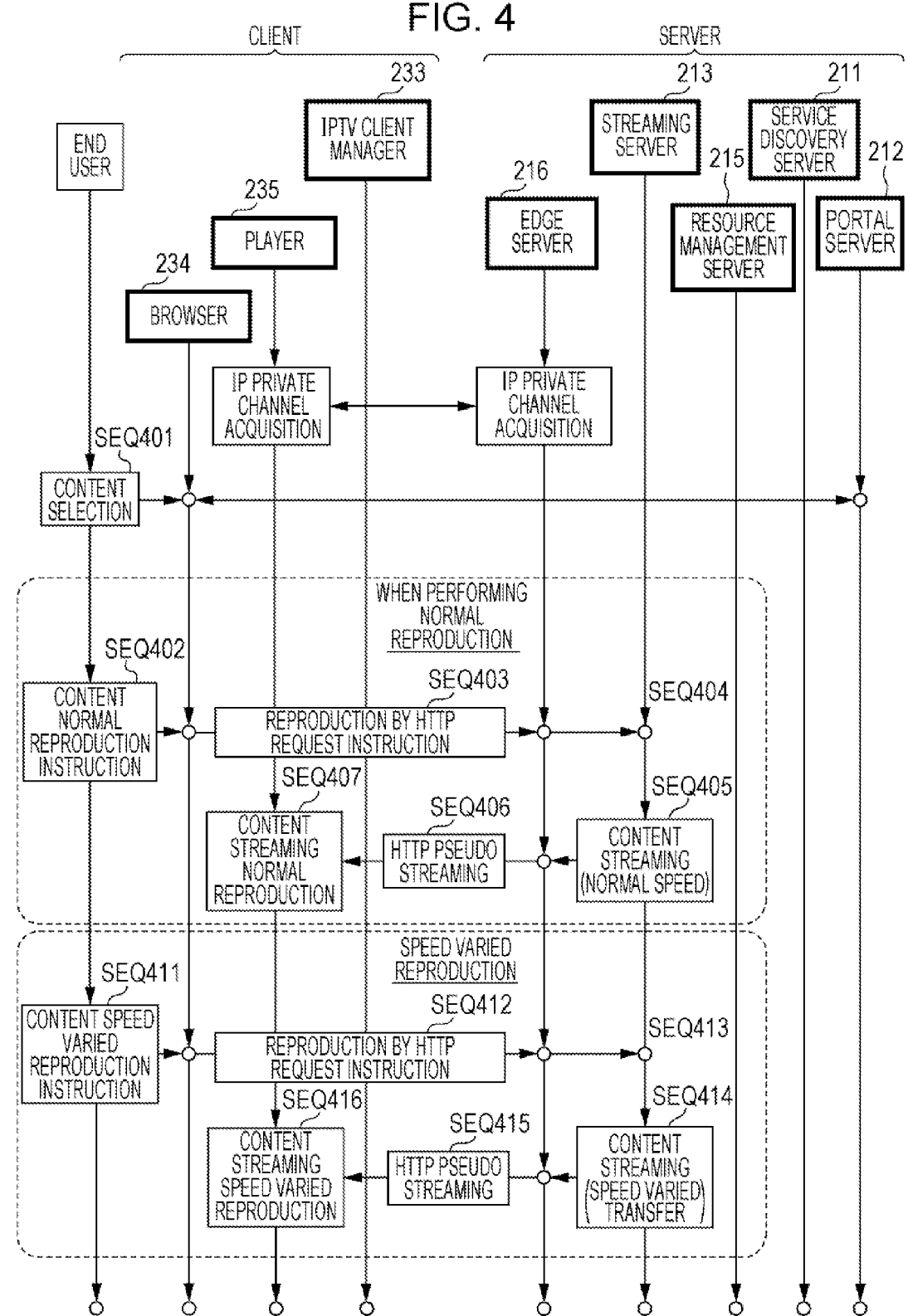
FIG. 4 is a view showing a sequence example in detail which performs streaming reproduction and reproduction control of content on a client device in the IPTV distribution system.

FIG. 4 shows a sequence example (the processing after establishing the private channel) in further detail which performs reproduction control of the content stream using the above-described permanent streaming session on the client device 231 in the IPTV distribution system 100.

When a private channel is established between the translation server on the edge server 216 and the player 235, the end user performs the selection of the content using the content navigation function of the portal application which the browser 234 executes (SEQ 401). In the process of the content navigation, the portal application on the browser 234 performs transactions with the portal server, and the end user can select the desired content while referencing the attribute information of the content (the title, the outline, the price, and the like).

It is possible for the end user to perform reproduction control as in trick play, such as normal reproduction (play), stopping (stop), rewind reproduction (rewind), fast forward reproduction (forward), and pause using the portal application executed by the browser 234.

First, description will be given of a case in which the content stream is reproduced at normal speed.

The end user instructs the normal reproduction of the content being streamed on the browser screen executing the portal application after selecting the content to perform streaming reproduction in the above-described manner (SEQ 402).

The portal application on the browser 234, in addition to the URL of the content that the end user selected, issues a reproduction control command that instructs normal reproduction and instructs the export of the content stream in relation to the translation server on the edge server 216 (SEQ 403).

The interactions of the reproduction instruction from the end user are all detected by the portal application, and the transaction server on the edge server 216 is notified of the interactions as reproduction control commands.

Here, the portal application performs the reproduction instructions by HTTP requests such as AJAX (Asynchronous JavaScript (registered trademark)+XML). The translation server on the edge server 216 performs transactions by converting the reproduction control commands from the browser script executed as the portal application on the client device 231 into an individual IPTV service reproduction control protocol which can be interpreted by the streaming server 213. In other words, the translation server performs reproduction instructions in relation to the streaming server 213 (SEQ 404).

For example, if the streaming server 213 can interpret RTSP, the translation server converts the reproduction control command from the portal application into an RTSP transfer instruction and transfers the RTSP transfer instructions. Alternatively, when the streaming server 213 is an HTTP pseudo streaming server which can only interpret HTTP, the translation server converts the reproduction control command from the portal application into a content request in HTTP pseudo streaming and transfers the content request.

In relation to this, the streaming server 213 exports the selected content stream at the normal speed instructed by the reproduction control command (SEQ 405). The streaming server 213 performs streaming using RTP or the like, or returns an HTTP pseudo streaming response.

The translation server on the edge server 216 converts the individual streaming format for the provider (transport protocol (RTSP/RTP/RTCP)/codec/container) exported from the streaming server 213 into a format (HTTP streaming/codec/container which the client player is capable of processing) which can be processed by the player which operates on the client device 231, and exports the converted format (HTTP pseudo streaming) (SEQ 406). Furthermore, on the client device 231, the player performs reproduction of the received stream (SEQ 407).

Next, description will be given of a case in which the end user performs speed varied reproduction of the content stream.

The end user, for example, during stream reproduction at the normal speed, instructs the speed varied reproduction of the content being streamed on the screen of the browser 234 executing the portal application (SEQ 411).

The portal application issues a reproduction control command that instructs the speed varied reproduction and instructs the export of the content stream in relation to the translation server on the edge server 216 (SEQ 412). The interactions of the trick play instruction from the end user are all detected by the portal application, and the transaction server on the edge server 216 is notified of the interactions as reproduction control commands.

The portal application performs the reproduction instructions using HTTP requests such as AJAX. Then, when the translation server on the edge server 216 receives the reproduction control commands which instructs the speed varied reproduction from the browser script executed as the portal application on the client device 231, the translation server converts the reproduction control commands into an individual IPTV service reproduction control protocol which can be interpreted by the streaming server 213 and performs reproduction instruction (SEQ 413). In relation to this, the streaming server 213 performs speed varied transfer on the selected content stream at the speed instructed by the reproduction control command (SEQ 414). The streaming server 213 performs streaming using RTP or the like, or returns an HTTP pseudo streaming response.

For example, if the streaming server 213 can interpret RTSP, the translation server converts the reproduction control command from the portal application into an RTSP transfer instruction and transfers the RTSP speed varied transfer instructions. If the speed varied reproduction instruction is for double speed, the content stream is exported at double speed from the streaming server 213. Alternatively, when the streaming server 213 is an HTTP pseudo streaming server which can only interpret HTTP, the translation server issues an HTTP request at double the normal speed and acquires the content stream from the edge server 213 at double speed.

When the translation server on the edge server 216 receives speed varied content via one of the above-described methods, the translation server processes the stream such that the player 235 of the client device 231 side only has to perform the same processing as in normal reproduction and transfers the stream (SEQ 415). At this time, the translation server converts the individual streaming format for the provider (transport protocol (RTSP/RTP/RTCP)/codec/container) exported from the streaming server 213 into a format (HTTP streaming/codec/container which the client player 235 is capable of processing) which can be processed by the player which operates on the client device 231, and exports the converted format (HTTP pseudo streaming) (SEQ 415). Furthermore, on the client device 231, the player 235 performs reproduction of the received stream (SEQ 416).

By adopting the configuration of the IPTV distribution system 100 which interposes a translation server as described above, it is no longer necessary for the client vendor to implement an individual service protocol for each service as the client application, and it is possible to greatly reduce the development costs of the clients which support the services of the providers of different services (network services, internet services).

Next, description will be given of the means to realize the high speed channel changing in the IPTV distribution system 100 with reference to FIG. 5.

Figure 5:
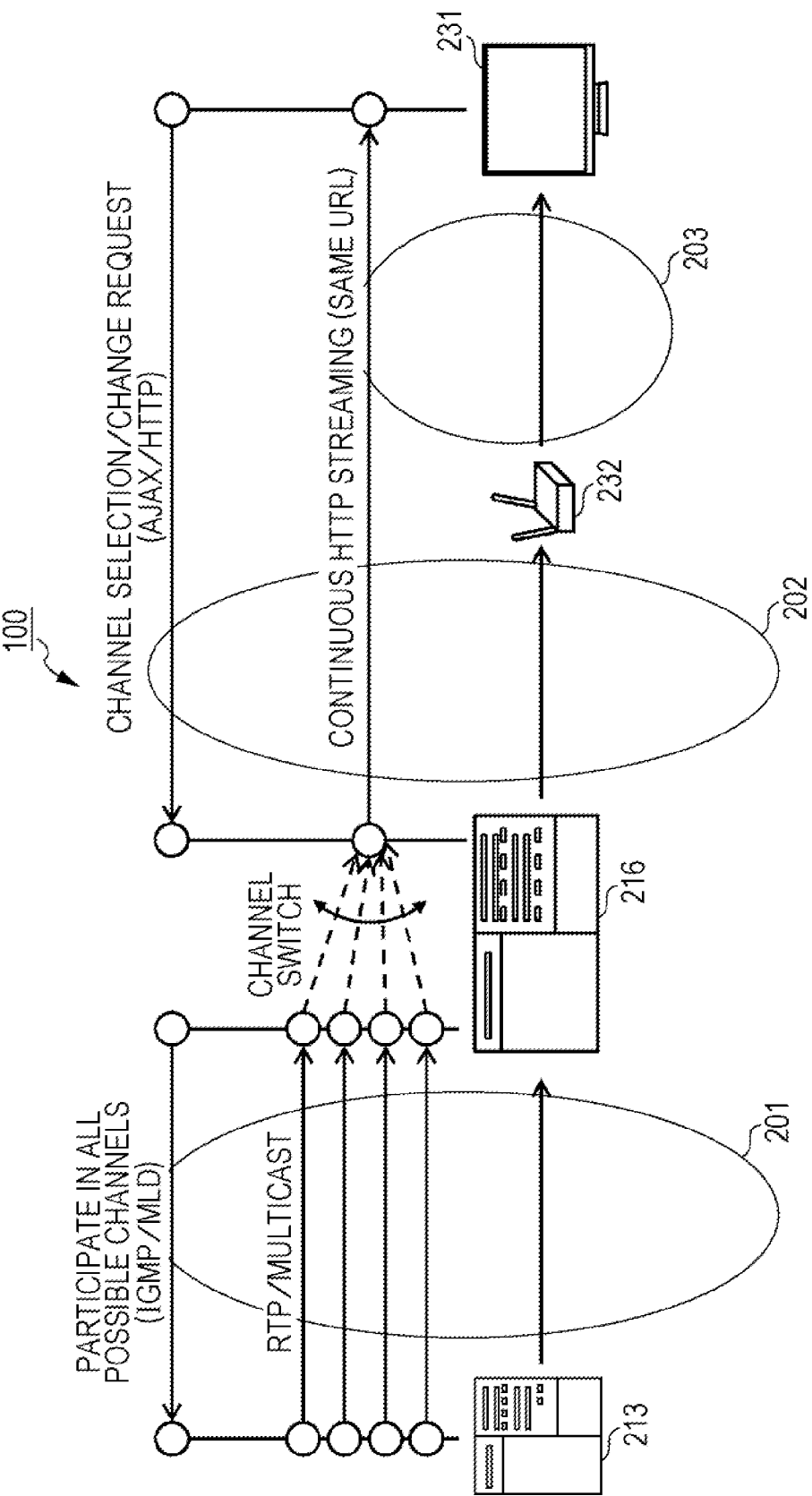
FIG. 5 is a diagram illustrating the means to realize high speed channel changing in the IPTV distribution system.

As shown in FIG. 5, it is assumed that in the core network 201, the IP broadcast channels (including live relay streams and the like) provided by IPTV services which correspond to the IPTV service translation server on the edge server 216 are all being broadcast from the streaming server 213 to the edge server 216. In other words, at the same time as the IPTV service translation server is downloaded to the edge server 216 and launched, a stream forwarding request is performed in relation to all of the IP broadcasts which the IPTV service translation server is capable of accessing (providing service).

Specifically, when multicasting is used for the transport protocol of the IP broadcast channel in the core network 201, directly after the translation server has been downloaded to the edge server 216 and launched, a participation (acquisition) request is performed in relation to all of the multicast channels which the streaming server 213 is capable of providing service of via a multicast router in the core network 201. RTP and multicasting are used for the transmission of the channel stream from the streaming server 213 to the translation server. In addition, Internet Group Management Protocol (IGMP) and Multicast Listener Discovery (MLD) are used for the participation to the multicast channels.

When the channel is selected using the portal application which operates on the browser of the client device 231, the portal application requests the selection or change of the channel in relation to the IPTV service translation server on the edge server 216 as an AJAX/HTTP request. Furthermore, the translation server instantly performs channel switching to the desired channel stream. When the end user selects a certain channel, since the channel is already being broadcast by multicast from the streaming server 213, the IPTV service translation server on the edge server 216 can instantly transmit (in other words, perform HTTP streaming) the corresponding multicast streaming to the player on the client device 231.

When the end user selects a different channel by channel zapping or the like, since the stream of the newly selected channel is also already being multicast from the streaming server 213, it is possible to channel switch to a desired channel instantly. Therefore, the performance of channel zapping is greatly improved. Furthermore, the client constantly receives the HTTP streaming from the same URL (referring to the translation server) even before and after the channel change.

However, when the corresponding IPTV service translation server may not participate (register) in all of the multicast channel streams it is capable of accessing due to restrictions in the resources of the core network 201, it is possible to devise a network resource load reduction plan. For example, when the end user selects a certain channel, the number of multicasts to be participated in may be restricted by selectively participating in multicasts of channels before and after (this may be "before and after" on the channel list, or may be "before and after" on a channel list showing only channels with a high access frequency, taking the preferences of the end user into account) the selected channel, or the like.

Figure 6:
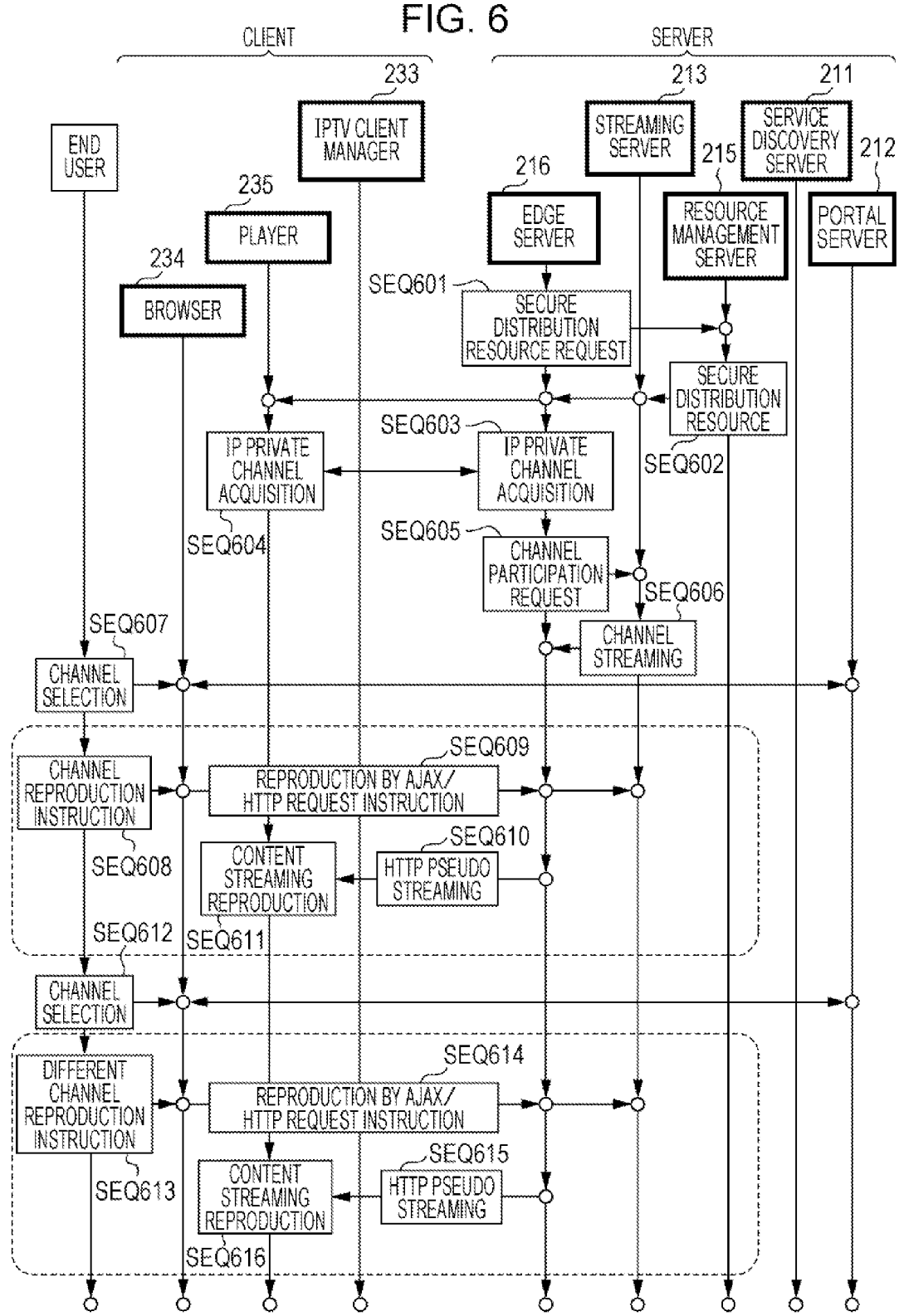
FIG. 6 is a view showing a sequence example for performing a channel stream distribution service by using a permanent streaming session in the IPTV distribution system.

FIG. 6 shows a sequence example for performing a channel stream distribution service by using a permanent streaming session in the IPTV distribution system 100. In the illustrated sequence, streaming is performed corresponding to the channel request of the content from the client side. Hereinafter, the workings of the IPTV distribution system 100 shown in FIG. 5 will be described with reference to FIG. 6.

The IPTV service translation server on the edge server 216, directly after being downloaded and launched, requests, in relation to the resource management server 215, the securing of the distribution resources such as the CPU, the memory region and the network interface, which are necessary for the IPTV private channel which performs channel streaming to the player (SEQ 601).

The resource management server 215, in response to this request, constantly secures the above-described communication resources from the establishment of the streaming session to the release thereof (SEQ 602). Furthermore, for the distribution resource securing, the IMS/SIP protocol used in carrier private networks such as NGN, the OpenFlow-API, individual protocols for carrier networks, or the like may be used (as above).

Furthermore, between the IPTV service translation server on the edge server 216 and the player 235, one HTTP pseudo streaming channel (session) with guaranteed bandwidth is established as a private channel (SEQ 603, 604). The IPTV private channel is permanent, and is a bandwidth guaranteed path in which HTTP request transmission from the player, and HTTP response from the translation server on the edge server 216 are typically possible. The IPTV service translation server on the edge server 216 constantly transfers the streaming on all of the channels to the player side. If necessary, the security of the HTTP pseudo streaming session is secured using SSL or the like.

Next, the IPTV service translation server on the edge server 216, in relation to the streaming server 213, performs a participation (acquisition) request in relation to all of the multicast channels which may be selected (SEQ 605). In relation to this request, the streaming server 213 performs streaming using the normal speed transfer to the translation server on the edge server 216 in relation to all of the requested channels using RTP or the like (SEQ 606).

The end user performs the selection of the channel using the content navigation function of the portal application which the browser 234 executes (SEQ 607). In the process of the channel navigation, the portal application on the browser 234 performs transactions with the portal server 212, and the end user can select the desired channel while referencing the attribute information relating to the channel to be selected (the title, the outline, the price, and the like).

Furthermore, the end user instructs the portal application on the browser 234 to perform reproduction of the selected channel (SEQ 608).

The portal application on the browser 234 performs reproduction instruction of the selected channel using an HTTP request such as AJAX in relation to the translation server on the edge server 216 (SEQ 609). Participation in the target multicast stream using IGMP Join and the like is performed beforehand. Therefore, at this timing, the IPTV service translation server on the edge server 216 can instantly start the streaming of the selected channel by simply changing the multicast stream input port. Furthermore, the IPTV service translation server on the edge server 216 exports the content stream of the selected channel using HTTP pseudo streaming (SEQ 610). Furthermore, on the client device 231, the player performs reproduction of the received content stream (SEQ 611).

Next, the end user performs the selection of the channel using the channel navigation function of the portal application on the browser (SEQ 612). In the process of the channel navigation, the portal application on the browser 234 performs transactions with the portal server 212, and the end user selects the desired channel while referencing the attribute information relating to the channel to be selected (as above).

Furthermore, the end user instructs the portal application on the browser 234 to perform reproduction of a different channel to the one described above (SEQ 613). The portal application on the browser performs reproduction instruction of the selected channel using an HTTP request such as AJAX in relation to the translation server on the edge server 216 (SEQ 614). Since participation in the target multicast stream using IGMP Join and the like is performed beforehand, at this timing, the streaming of the selected channel is instantly started by simply changing the multicast stream input port. Furthermore, the IPTV service translation server on the edge server 216 exports the content stream of the selected channel using HTTP pseudo streaming (SEQ 615). On the client device 231, the player 235 performs reproduction of the received content stream (SEQ 616).

In the sequence example shown in FIG. 6, the IPTV service translation server on the edge server 216 performs HTTP pseudo streaming of the supported channel stream among the channels being transmitted by multicast from the streaming server 213 to the player 235 on the client device 231. In relation to this, when there is a sufficient accumulation storage region (storage) of memory, a hard disk, or the like on the edge server 216, it is possible to improve the performance of the trick play mode (mainly, rewind reproduction) during the multicast channel reproduction by accumulating the channel stream exported from the streaming server 213 in the accumulation storage region.

At the same time as the IPTV service translation server is downloaded to the edge server 216 and launched, a forwarding request is performed in relation to all of the IP broadcast channels which the translation server is capable of accessing (providing service). Specifically, when multicasting is used for the transport protocol of the IP broadcast channel in the core network 201, directly after the IPTV service translation server has been downloaded to the edge server 216 and launched, a participation (acquisition) request is performed in relation to all of the multicast channels which the streaming server 213 is capable of providing service via a multicast router in the core network 201. Here, all of the multicast streams transmitted to the edge server 216, when received by the edge server 216, are accumulated at the same time in the storage region described above. Furthermore, when the end user instructs rewind reproduction, it is possible to greatly improve the performance of the rewind reproduction of the IP broadcast channel by performing reproduction from the stream which is already accumulated in the accumulation storage region of the edge server 216.

However, when the corresponding IPTV service translation server may not accumulate the portion which was already distributed of all of the multicast channel streams it is capable of accessing due to restrictions in the resources of the core network 201, or restrictions in the accumulation storage area of the edge server 216, it is possible to devise a network resource and storage resource load reduction plan. For example, when the end user selects a certain channel, by selectively participating in multicasts of channels before and after (this may be "before and after" on the channel list, or may be "before and after" on a channel list showing only channels with a high access frequency, taking the preferences of the end user into account) the selected channel, or the like, only the above multicast streams are accumulated in the edge server 216, thereby reducing the load of the network resources and the storage resources.

Figure 7:
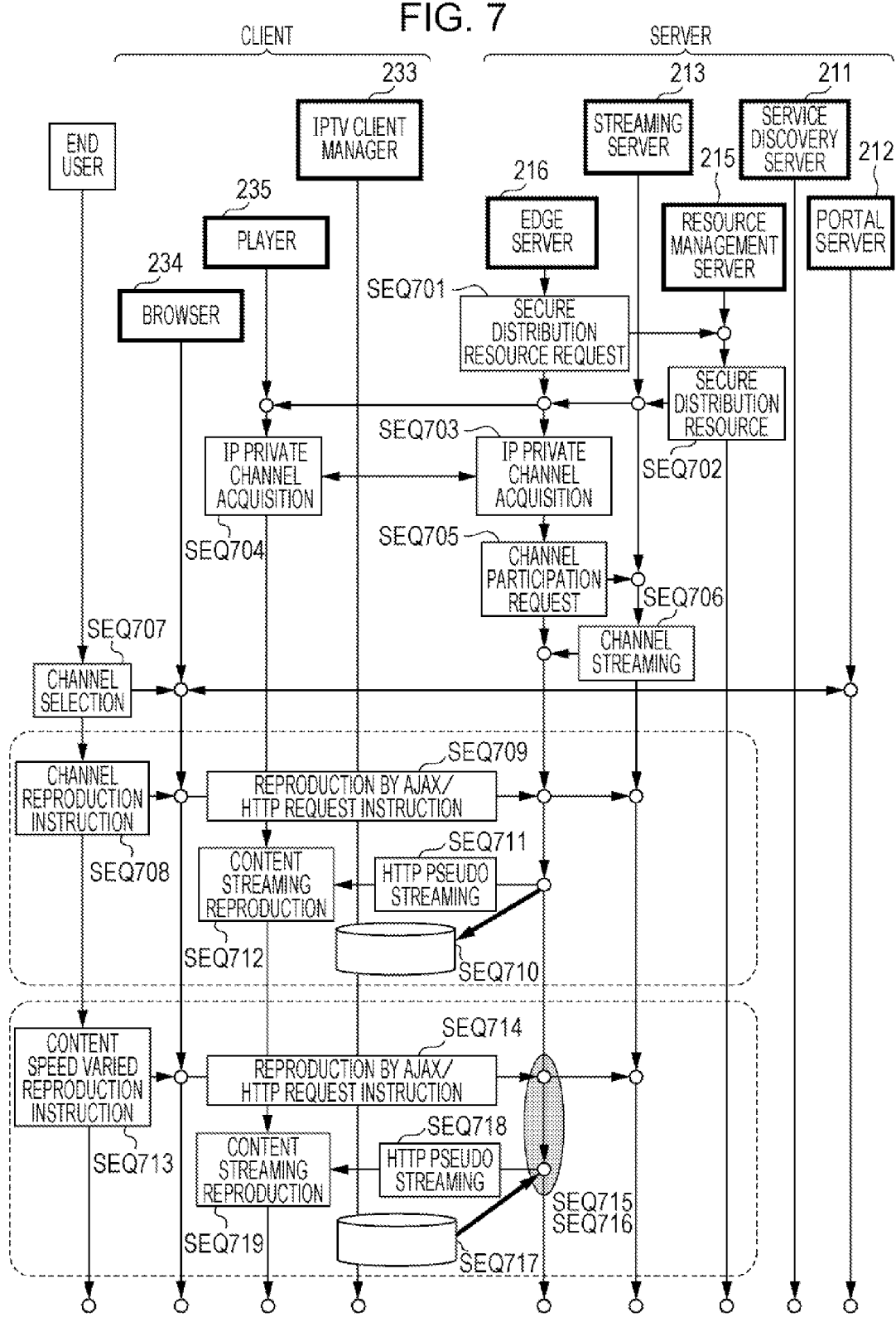
FIG. 7 is a view showing a sequence example for performing a channel stream distribution service by using a permanent streaming session in the IPTV distribution system (in a case in which speed varied reproduction of the channel or stream is supported)

FIG. 7 shows a sequence example for performing a channel stream distribution service by using a permanent streaming session in the IPTV distribution system 100. In the illustrated sequence, the edge server 216 is provided with storage in which is accumulated the streams and can support the speed varied reproduction of the channel streams.

The IPTV service translation server on the edge server 216, directly after being downloaded and launched, requests, in relation to the resource management server 215, the securing of the distribution resources such as the CPU, the memory region and the network interface, which are necessary for the IPTV private channel which performs channel streaming to the player (SEQ 701).

The resource management server 215, in response to this request, constantly secures the above-described communication resources from the establishment of the streaming session to the release thereof (SEQ 702). Furthermore, for the distribution resource securing, the IMS/SIP protocol used in carrier private networks such as NGN, the OpenFlow-API, individual protocols for carrier networks, or the like may be used (as above).

Furthermore, between the IPTV service translation server on the edge server 216 and the player 235, one HTTP pseudo streaming channel (session) with guaranteed bandwidth is established as a private channel (SEQ 703, 704). This IPTV private channel is permanent, and is a bandwidth guaranteed path in which HTTP request transmission from the player 235, and HTTP response from the translation server on the edge server 216 are typically possible. The IPTV service translation server on the edge server 216 constantly transfers the streaming on all of the channels to the player 235 side. If necessary, the security of the HTTP pseudo streaming session is secured using SSL or the like.

Next, the IPTV service translation server on the edge server 216, in relation to the streaming server 213, performs a participation (acquisition) request in relation to all of the multicast channels which may be selected (SEQ 705). In relation to this request, the streaming server 213 performs streaming using the normal speed transfer to the translation server on the edge server 216 in relation to all of the requested channels using RTP or the like (SEQ 706).

The end user performs the selection of the channel using the content navigation function of the portal application which the browser 234 executes (SEQ 707). In the process of the channel navigation, the portal application on the browser 234 performs transactions with the portal server 212, and the end user can select the desired channel while referencing the attribute information relating to the channel to be selected (the title, the outline, the price, and the like).

Furthermore, the end user instructs the portal application on the browser 234 to perform reproduction of the selected channel (SEQ 708).

The portal application on the browser performs reproduction instruction of the selected channel using an HTTP request such as AJAX in relation to the translation server on the edge server 216 (SEQ 709). Participation in the target multicast stream using IGMP Join and the like is performed beforehand. Therefore, at this timing, the IPTV service translation server on the edge server 216 can instantly start streaming the selected channel by simply changing the multicast stream input port. Furthermore, the IPTV service translation server on the edge server 216 accumulates the content stream of the selected channel in the storage of the edge server 216 (SEQ 710), while exporting the content stream using HTTP pseudo streaming (SEQ 711). Furthermore, on the client device 231, the player 235 performs reproduction of the received content stream (SEQ 712).

Next, the end user performs the instruction of the speed varied reproduction of the content stream using the channel navigation function of the portal application on the browser (SEQ 713). The portal application on the browser 234 performs speed varied reproduction instruction of the content using an HTTP request such as AJAX in relation to the translation server on the edge server 216 (SEQ 714).

When the translation server on the edge server 216 receives the reproduction control commands which instructs the speed varied reproduction from the browser script executed as the portal application on the client device 231, the translation server confirms whether or not the past broadcast portion of the target channel has already finished being accumulated in the storage thereof (SEQ 715).

At this time, if the past broadcast portion of the target channel has already finished being accumulated in the storage, it is determined to be possible to perform speed varied reproduction. When the translation server fetches the corresponding channel stream from those which have finished being accumulated in the storage thereof (SEQ 716), the translation server processes the stream such that the player on the client device 231 only has to perform the same processing as in normal reproduction (it is possible to perform speed varied reproduction) (SEQ 717).

Furthermore, the translation server exports the channel stream, which has undergone with above-described processing, using HTTP pseudo streaming (SEQ 718). On the client device 231, the player performs normal reproduction of the received content stream, therefore it is possible to present the speed varied reproduced stream to the end user (SEQ 719).

As described above, in the IPTV distribution system 100 according to the present embodiment, the functions of an IPTV service client provided from a plurality of different service providers may be separated into navigation (a function of selecting the content), reproduction control (a function which sends commands as in trick play, such as normal reproduction (play), stopping (stop), rewind reproduction (rewind), fast forward reproduction (forward), and pause), and streaming (a function which transfers and reproduces the AV stream), the first two being realized as a browser application, and the latter one being implemented as a player which is transparent to the IPTV service protocol (is common and does not depend on the differences between the IP service protocols).

Therefore, it is sufficient for the device vendor to develop a browser application for each service, and it is possible to reduce the cost of individually implementing and maintaining clients for a plurality of different services. In addition, for the service provider, since the content which the end user selected via the browser is streamed using the RTP protocol through a network in which the quality is guaranteed in accordance with the reproduction control commands specified on the browser, it is possible to achieve unification of the service quality. In addition, it is possible to greatly improve the performance when performing a channel change in the IP broadcast distribution despite using an HTTP streaming client.

Furthermore, the technology disclosed in the present specification may be configured as described below.

(1) A content transfer device including a channel establishment unit which establishes a channel on a network with a content reproduction device that reproduces a content stream; a reproduction control command reception unit which receives a reproduction control command that controls reproduction of the content stream from the content reproduction device via the network; and a streaming unit which exports the content stream to the content reproduction device using the channel in accordance with the received reproduction control command.

(2) The content transfer device according to (1), in which the channel establishment unit establishes the channel according to a request from a player which reproduces the content stream on the content reproduction device.

(3) The content transfer device according to (1), in which the channel establishment unit establishes a channel, which is formed from a bandwidth guaranteed path in which HTTP request transmission and HTTP response with the content reproduction device are typically possible, on the network.

(4) The content transfer device according to (1), in which the reproduction control command reception unit receives a reproduction control command which a browser application that operates in a browser execution environment of the content reproduction device issued according to an instruction of a user, as an HTTP request.

(5) The content transfer device according to (1), in which the streaming unit exports the content stream to a player transparent to a service protocol which operates on the content reproduction device.

(6) The content transfer device according to (1), in which the streaming unit acquires the content stream, which a browser application that operates in a browser execution environment of the content reproduction device requests according to a selection of a user using an HTTP request, from a streaming server and exports the content stream to the content reproduction device.

(7) The content transfer device according to (1), in which the streaming unit, according to a request from the content reproduction device, converts a streaming format exported from a streaming server into a format which can be processed by a player that performs streaming reproduction on the content reproduction device side and exports the stream to the content reproduction device.

(8) The content transfer device according to (1), in which the reproduction control command reception unit performs transactions with a streaming server by converting the received reproduction control commands into a reproduction control protocol which can be interpreted by the streaming server that exports content according to a streaming request from the content reproduction device.

(9) The content transfer device according to (8), in which the reproduction control command reception unit performs transactions with the streaming server which can interpret RTSP by converting the reproduction control command relating to speed varied reproduction of the stream into an RTSP speed varied transfer instruction.

(10) The content transfer device according to (8), in which the reproduction control command reception unit, in relation to an HTTP pseudo streaming server which can only interpret HTTP, converts the reproduction control command relating to the reproduction speed of the stream into a content request in HTTP streaming, and issues an HTTP request to the HTTP pseudo streaming server at a speed corresponding to the speed instructed by the reproduction control command.

(11) The content transfer device according to (1), further including storage in which is accumulated the content stream received from a streaming server, in which the streaming unit, when a reproduction control command relating to speed varied reproduction of the stream is received by the reproduction control command reception unit, processes the stream such that a player that operates on the content reproduction device can perform speed varied reproduction using the same processing as in normal reproduction.

(12) The content transfer device according to (1), in which the channel establishment unit, the reproduction control command reception unit and the streaming unit are realized as functions of a translation server which is downloaded from a designated portal server and launched.

(13) The content transfer device according to (1), in which the content transfer device operates as an edge server interposed between a streaming server which exports the content stream and a content reproduction device.

(14) A content transfer method including establishing a channel on a network with a content reproduction device that reproduces a content stream; receiving a reproduction control command that controls reproduction of the content stream from the content reproduction device via the network; and exporting the content stream to the content reproduction device using the channel in accordance with the received reproduction control command.

(15) A content transfer device including a navigation unit which requests streaming of content selected according to an instruction of a user using an HTTP request; a reproduction control unit which performs reproduction control of the streaming of content according to the instruction of the user; and a player which reproduces the content stream received via a channel established with a designated server.

(16) The content reproduction device according to (15), further including a browser execution environment, wherein the navigation unit and the reproduction control unit are realized as a browser application which is executed in the browser execution environment; and wherein the player is transparent to the service protocol.

(17) The content reproduction device according to (15), in which the player requests establishment of the channel to the server according to a request from the browser application.

(18) The content reproduction device according to (15), in which the content reproduction device is formed from a bandwidth guaranteed path in which HTTP request transmission and HTTP response with an edge server which transfers a content stream are typically possible.

(19) A content transfer method including requesting streaming of content selected according to an instruction of a user using an HTTP request; performing reproduction control of the streaming of content according to the instruction of the user; and reproducing the content stream received via a channel established with a designated server.

(20) A content distribution system including a content reproduction device which performs an instruction of selection of content and reproduction control of content by HTTP request in addition to performing stream reproduction of content using a player which is transparent to a service protocol; a streaming server which exports a content stream which the content reproduction device selected; and an edge server which performs transactions with the streaming server by converting reproduction control commands issued by the content reproduction device into a protocol which can be interpreted by the streaming server, as well as converting the content stream exported from the streaming server into a format which can be processed by the player and transferring the content stream using a channel established with the content reproduction device.

(21) The content distribution system according to (20), further including a resource management server which secures distribution resources necessary for the channel.

(22) A computer program written in a computer readable format causing a computer to function as a channel establishment unit which establishes a channel on a network with a content reproduction device that reproduces a content stream; a reproduction control command reception unit which receives a reproduction control command that controls reproduction of the content stream from the content reproduction device via the network; and a streaming unit which exports the content stream to the content reproduction device using the channel in accordance with the received reproduction control command.

(23) A computer program written in a computer readable format causing a computer to function as a navigation unit which requests streaming of content selected according to an instruction of a user using an HTTP request; a reproduction control unit which performs reproduction control of the streaming of content according to the instruction of the user; and a player which reproduces the content stream received via a channel established with a designated server.

Furthermore, the technology disclosed in the present specification may also be configured as described below.

(1) An apparatus including:
a control unit to control transmission of a transformed video stream over a network, in response to a reproduction control command for a video stream realized by an application executed by a browser at a client device.

(2) The apparatus according to (1), wherein the reproduction control command indicates a trick play including at least one of play, stop, rewind, forward or pause.

(3) The apparatus according to (1), wherein the reproduction control command is transmitted as a Hyper Text Transfer Protocol (HTTP) request from the browser.

(4) The apparatus according to (1), wherein the transmission of the transformed video stream is by executing a predetermined server application downloaded to the apparatus.

(5) The apparatus according to (1), wherein, when the reproduction control command instructs speed varied reproduction, the control unit converts the reproduction control command into an individual service reproduction control protocol which can be interpreted by a content streaming server that performs speed varied transfer on a selected content stream at a speed instructed by the reproduction control command.

(6) The apparatus according to (5), wherein the control unit controls transmission of the selected content stream at the speed instructed as the transformed video stream.

(7) The apparatus according to (6), wherein the transformed video stream is in a format that can be processed by a player operating on the client device.

(8) The apparatus according to (7), wherein the format of the transformed video stream is Hyper Text Transfer Protocol (HTTP) pseudo streaming.

(9) The apparatus according to (1), wherein the transformed video stream is transmitted independently of a service protocol.

(10) The apparatus according to (1), wherein, when a memory of the apparatus has a predetermined storage, the control unit controls storing of a video stream from a server in the memory.

(11) The apparatus according to (10), wherein the predetermined storage can support speed varied reproduction of the video stream from the server as the transformed video stream.

(12) The apparatus according to (10), wherein the control unit determines whether a portion of the video stream from the server is in the memory.

(13) A method comprising:
controlling, by a processor, transmission of a transformed video stream over a network, in response to a reproduction control command for a video stream realized by an application executed by a browser at a client device.

(14) A non-transitory recording medium recorded with a program executable by a computer, the program comprising:
controlling transmission of a transformed video stream over a network, in response to a reproduction control command for a video stream realized by an application executed by a browser at a client device.

(15) An apparatus including:
a control unit to control transmission of a reproduction control command for a video stream realized by an application executed by a browser, to cause transmission of a transformed video stream from another apparatus over a network.

(16) A method including:
controlling, by a processor, transmission of a reproduction control command for a video stream realized by an application executed by a browser, to cause transmission of a transformed video stream from an apparatus over a network.

However, it is clear that a person skilled in the art may achieve corrections and replacements of the embodiments within a scope that the spirit of the present disclosure is not departed from.

What is claimed is:

1. An apparatus comprising:
   a reception unit to receive a reproduction control command transmitted as a Hyper Text Transfer Protocol (HTTP) request for a video stream realized and issued by an application executed by a browser at a client device and indicating an interaction detected by the application at the client device; and
   a control unit to control transmission of a transformed video stream over a network in response to the reproduction control command received by the reception unit, in which, when a selected content stream is from speed varied transfer of content in accordance with the reproduction control command, in which the selected content stream has a first format protocol as exported from a server, the control unit converts the selected content stream from the first format protocol to a second format protocol to obtain the transformed video stream, the second format protocol having a format protocol such that a player operating on the client device can reproduce the transformed video stream having the second format protocol by performing a same reproduction processing that the player performs to reproduce the transformed video stream obtained from conversion by the control unit of a format protocol of the content transferred at a speed without variation as the selected content stream exported from the server,
   in which the second format protocol is Hyper Text Transfer Protocol (HTTP) pseudo streaming protocol, and
   in which the first format protocol is different from (i) the Hyper Text Transfer Protocol and (ii) the HTTP pseudo streaming protocol,
   such that the control unit is configured (i) to convert the protocol of the received reproduction control command from the Hyper Text Transfer Protocol to the first format protocol and to cause the reproduction control command having the first format to be outputted for receipt by the server, and (ii) to convert the protocol of the selected content stream from the first format protocol to the HTTP pseudo streaming protocol to obtain the transformed video stream and to cause the transformed video stream to be outputted for receipt by the player operating on the client device.

2. The apparatus of claim 1, wherein the reproduction control command indicates a trick play including at least one of play, stop, rewind, forward or pause.

3. The apparatus of claim 1, wherein the transmission of the transformed video stream is by executing a predetermined server application downloaded to the apparatus.

4. The apparatus of claim 1, wherein the control unit controls transmission of the selected content stream at the speed instructed as the transformed video stream.

5. The apparatus of claim 1, wherein the transformed video stream is transmitted independently of a service protocol.

6. The apparatus of claim 1, wherein, when a memory of the apparatus has a predetermined storage, the control unit controls storing of a video stream from the server in the memory.

7. The apparatus of claim 6, wherein the predetermined storage can support speed varied reproduction of the video stream from the server as the transformed video stream.

8. The apparatus of claim 6, wherein the control unit determines whether a portion of the video stream from the server is in the memory.

9. A method comprising:
   controlling, by a processor, transmission of a transformed video stream over a network, in response to a reproduction control command transmitted as a Hyper Text Transfer Protocol (HTTP) request for a video stream realized and issued by an application executed by a browser at a client device and indicating an interaction detected by the application at the client device,
   in which, when a selected content stream is from speed varied transfer of content in accordance with the reproduction control command, in which the selected content stream has a first format protocol as exported from a server, the processor converts the selected content stream from the first format protocol to a second format protocol to obtain the transformed video stream, the second format protocol having a format protocol such that a player operating on the client device can reproduce the transformed video stream having the second format protocol by performing a same reproduction processing that the player performs to reproduce the transformed video stream obtained from conversion by the processor of a format protocol of the content transferred at a speed without variation as the selected content stream exported from the server,
   in which the second format protocol is Hyper Text Transfer Protocol (HTTP) pseudo streaming protocol, and
   in which the first format protocol is different from (i) the Hyper Text Transfer Protocol and (ii) the HTTP pseudo streaming protocol,
   such that the controlling includes (i) converting the protocol of the reproduction control command from the Hyper Text Transfer Protocol to the first format protocol and transferring the reproduction control command having the first format to the server, and (ii) converting the protocol of the selected content stream from the first format protocol to the HTTP pseudo streaming protocol to obtain the transformed video stream and causing the transformed video stream to be outputted for receipt by the player operating on the client device.

10. A non-transitory recording medium recorded with a program executable by a computer, the program comprising:
    controlling transmission of a transformed video stream over a network, in response to a reproduction control command transmitted as a Hyper Text Transfer Protocol (HTTP) request for a video stream realized and issued by an application executed by a browser at a client device and indicating an interaction detected by the application at the client device,
    in which, when a selected content stream is from speed varied transfer of content in accordance with the reproduction control command, in which the selected content stream has a first format protocol as exported from a server, converting the selected content stream from the first format protocol to a second format protocol to obtain the transformed video stream, the second format protocol having a format protocol such that a player operating on the client device can reproduce the transformed video stream having the second format protocol by performing a same reproduction processing that the player performs to reproduce the transformed video stream obtained from converting a format protocol of the content transferred at a speed without variation as the selected content stream exported from the server, in which the second format protocol is Hyper Text Transfer Protocol (HTTP) pseudo streaming protocol, and in which the first format protocol is different from (i) the Hyper Text Transfer Protocol and (ii) the HTTP pseudo streaming protocol, such that the controlling includes (i) converting the protocol of the reproduction control command from the Hyper Text Transfer Protocol to the first format protocol and transferring the reproduction control command having the first format to the server, and (ii) converting the protocol of the selected content stream from the first format protocol to the HTTP pseudo streaming protocol to obtain the transformed video stream and causing the transformed video stream to be outputted for receipt by the player operating on the client device.

11. An apparatus to control transmission of a video stream over a network or networks, said apparatus for use in an IPTV system having a client device and a content streaming server connected by the network or networks, said apparatus comprising:

a reception unit to receive a reproduction control command transmitted as a Hyper Text Transfer Protocol (HTTP) request issued by an application executed by a browser at the client device and indicating an interaction detected by the application at the client device; and a control unit to (i) perform a protocol conversion on the received reproduction control command so that the reproduction control command can be interpreted by the content streaming server, (ii) supply the converted reproduction control command to the content streaming server, (iii) receive a selected content stream having a first format protocol from the content streaming server in response to receipt of the converted reproduction control command by the content streaming server, (iv) convert the received selected content stream from the first format protocol to a second format protocol so as to obtain the transformed video stream, and (v) supply the transformed video stream to the client device, in which the second format protocol is Hyper Text Transfer Protocol (HTTP) pseudo streaming protocol, and in which the first format protocol is different from (i) the Hyper Text Transfer Protocol and (ii) the HTTP pseudo streaming protocol, such that the control unit is configured (i) to convert the protocol of the received reproduction control command from the Hyper Text Transfer Protocol to the first format protocol such that the converted reproduction control command has the first format protocol, and (ii) to convert the protocol of the selected content stream from the first format protocol to the HTTP pseudo streaming protocol to obtain the transformed video stream and to cause the transformed video stream to be outputted.

12. The apparatus of claim 11, in which (i) when the reproduction control command instructs speed varied reproduction the control unit converts the reproduction control command into the first format protocol which can be interpreted by the content streaming server as a command to perform speed varied transfer on the selected content stream at a speed instructed by the reproduction control command, and (ii) when the selected content stream is from speed varied transfer of content in accordance with the reproduction control command the control unit converts the selected content stream from the first format protocol to the second format protocol to obtain the transformed video stream so that a player operating on the client device can reproduce the transformed video stream by performing a same reproduction processing that the player performs to reproduce the transformed video stream transferred at a speed without variation as the selected content stream from the content streaming server.

* * * * *